US012173883B1

(12) United States Patent
Zheng

(10) Patent No.: US 12,173,883 B1
(45) Date of Patent: Dec. 24, 2024

(54) WALL LAMP

(71) Applicant: Xinyu Zheng, Sichuan Province (CN)

(72) Inventor: Xinyu Zheng, Sichuan Province (CN)

( * ) Notice: Subject to any disclaimer, the term of this patent is extended or adjusted under 35 U.S.C. 154(b) by 0 days.

(21) Appl. No.: 18/797,841

(22) Filed: Aug. 8, 2024

(51) Int. Cl.

| | |
|---|---|
| ***F21V 3/02*** | (2006.01) |
| ***F21S 8/00*** | (2006.01) |
| ***F21S 9/02*** | (2006.01) |
| ***F21V 21/096*** | (2006.01) |
| ***F21V 23/00*** | (2015.01) |
| ***F21V 23/04*** | (2006.01) |

(52) U.S. Cl.
CPC ................ *F21V 3/02* (2013.01); *F21S 8/033* (2013.01); *F21S 9/02* (2013.01); *F21V 21/096* (2013.01); *F21V 23/003* (2013.01); *F21V 23/0435* (2013.01)

(58) Field of Classification Search
CPC ........ F21V 3/02; F21V 21/096; F21V 23/003; F21S 8/033; F21S 9/02
See application file for complete search history.

(56) References Cited

U.S. PATENT DOCUMENTS

| | | | | |
|---|---|---|---|---|
| 8,454,222 | B2 * | 6/2013 | Levon | G02B 6/0096 362/628 |
| 9,587,821 | B2 * | 3/2017 | Carroll | H05B 47/195 |
| 11,130,365 | B1 * | 9/2021 | Cook | F21V 23/06 |
| 12,070,699 | B1 * | 8/2024 | Gu | G09F 19/08 |
| 2013/0215617 | A1 * | 8/2013 | Carroll | F21V 33/0028 362/253 |
| 2016/0369999 | A1 * | 12/2016 | La Roque | F21S 9/02 |
| 2018/0328567 | A1 * | 11/2018 | Trevino | F21V 17/12 |
| 2024/0302011 | A1 * | 9/2024 | Wang | F21V 23/003 |

* cited by examiner

*Primary Examiner* — Bryon T Gyllstrom

(57) ABSTRACT

The present disclosure relates to the technical field of lighting fixtures, and provides a wall lamp. The wall lamp includes: a housing in the shape of an animal, where hollow structures are arranged on corresponding positions of the housing on a left side, a right side and a lower side respectively; lamp assemblies arranged inside the housing and configured for emitting light; a control panel arranged inside the housing, where the control panel is electrically connected to the lamp assemblies; a battery arranged on a side of the housing close to an installation wall, where the battery is electrically connected to the control panel; and a remote controller in communication connection with the control panel, configured for outputting control instructions. A shadow cast outside the housing when light emitted by the lamp assemblies passes through each of the hollow structures constitutes a part of the animal's shape.

7 Claims, 4 Drawing Sheets

WALL LAMP

TECHNICAL FIELD

The present disclosure relates to the technical field of lighting fixtures, and particularly to a wall lamp.

BACKGROUND

A wall lamp is an auxiliary decorative lighting fixture installed on an indoor or outdoor wall. In most of wall lamp structures of the prior art on the market, lamp beads are usually installed inside the lamp walls, to achieve lighting functions. Alternatively, an external structural design of a wall lamp can be changed for decorative purposes. However, the wall lamps in the prior art have disadvantages such as single use modes and poor visual effect.

Therefore, there is a need for improvement in this regard.

SUMMARY

In view of the above defects in the prior art, the present disclosure provides a wall lamp to solve the technical problems raised in the above Background.

In order to solve the above technical problems, the present disclosure adopts the following technical solution: a wall lamp, including: a housing, where the housing is in the shape of an animal, hollow structures are arranged on corresponding positions of the housing on a left side, a right side and a lower side respectively; lamp assemblies, where the lamp assemblies are arranged inside the housing, and the lamp assemblies are configured for emitting light; a control panel, where the control panel is arranged inside the housing, and the control panel is electrically connected to the lamp assemblies; a battery, where the battery is arranged on a side of the housing close to an installation wall, and the battery is electrically connected to the control panel; and a remote controller, where the remote controller is in communication connection with the control panel, and the remote controller is configured for outputting control instructions. A shadow cast outside the housing when light emitted by the lamp assemblies passes through each of the hollow structures constitutes a part of the animal's shape.

Further, the housing is in the shape of a bird.

Further, the hollow structures are formed by wing hole sites distributed in an array manner. The hollow structure on the left side is used to project a left wing of the bird, the hollow structure on the right side is used to project a right wing of the bird, and the hollow structure on the lower side is used to project a tail wing of the bird.

Further, the lamp assemblies are respectively arranged at corresponding positions of the hollow structures on the left side and the right side away from an end of the battery in the housing.

Further, a charging port is included, the charging port is arranged on the control panel and exposed outside the housing, and the charging port is configured for charging the battery.

Further, at least one opening is formed at a rear side position of the housing, and the opening is configured for hanging the wall lamp.

Further, a magnet is arranged at a rear side position of the housing, and the magnet is configured for magnetic suspension of the wall lamp.

Compared with the prior art, the present disclosure has the beneficial effects as follows:

1. The housing is designed to be shaped like an animal, and the hollow structures are arranged on the housing. When the lamp assemblies inside the housing work, a shadow cast when light emitted by the lamp beads passes through each of the hollow structures constitutes a part of the animal's shape, which enriches modes of using the wall lamp and enhances a visual effect of the wall lamp.

2. In combination with the remote controller, the wall lamp can be used in a controllable and more convenient manner.

3. A built-in battery is used to prolong the endurance of the wall lamp, and the wall lamp can be used in a wireless manner.

4. The wall lamp is easily installed and fixed by means of hole sites or magnetic adsorption.

Figure 1:
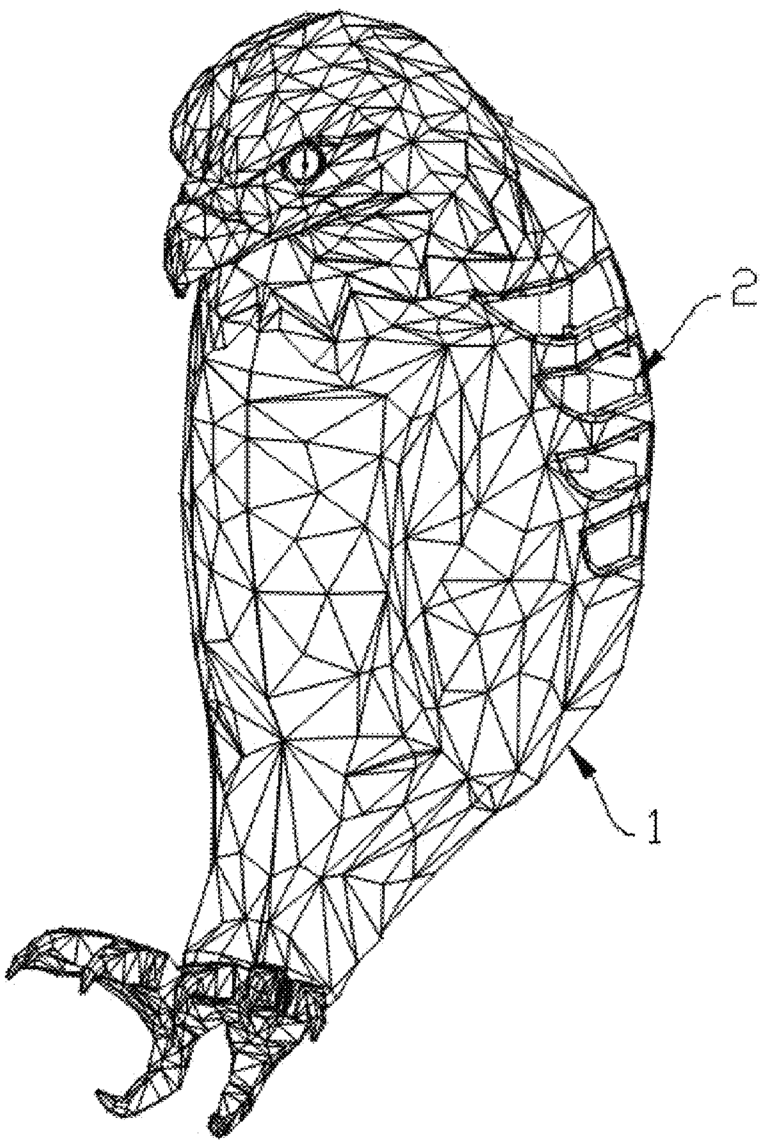
FIG. 1 is a schematic diagram of a structure of the present disclosure.

Reference numerals: 1. housing; 2. hollow structure; 3. lamp assembly; 4. control panel; 5. battery; 6. charging port; 7. opening; and 8. magnet.

DETAILED DESCRIPTIONS OF THE EMBODIMENTS

The present disclosure will be further described in detail below with reference to the accompanying drawings.

Figure 2:
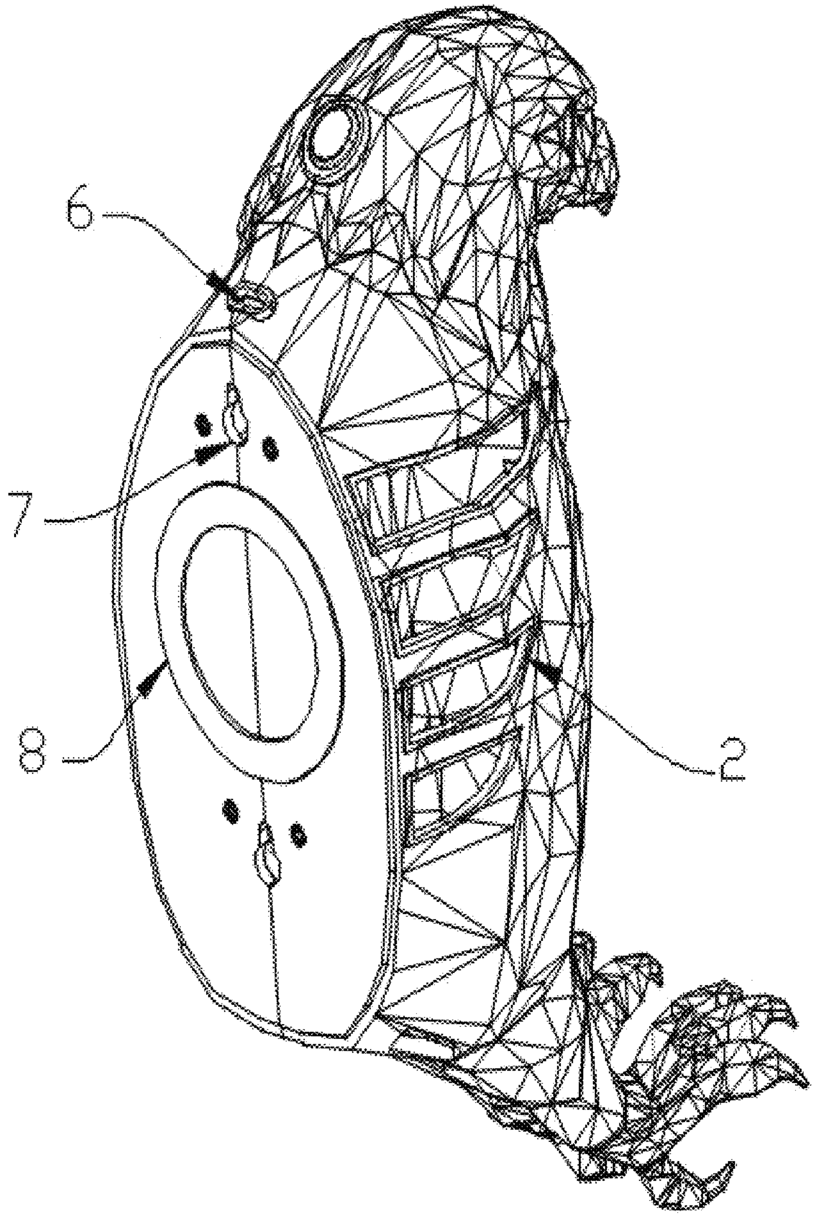
FIG. 2 is a schematic diagram of a structure of the present disclosure.
Figure 3:
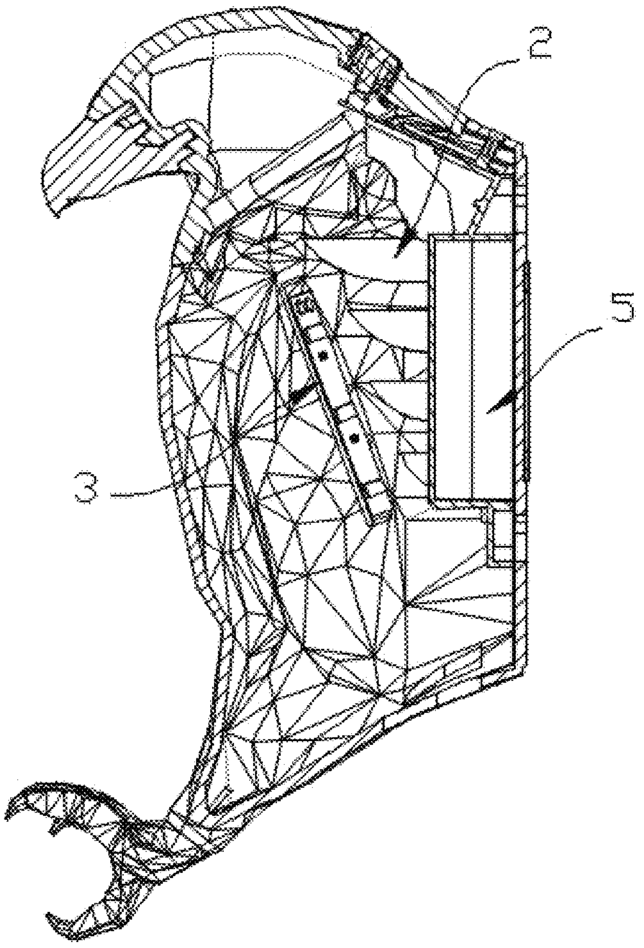
FIG. 3 is a sectional view of the present disclosure.
Figure 4:
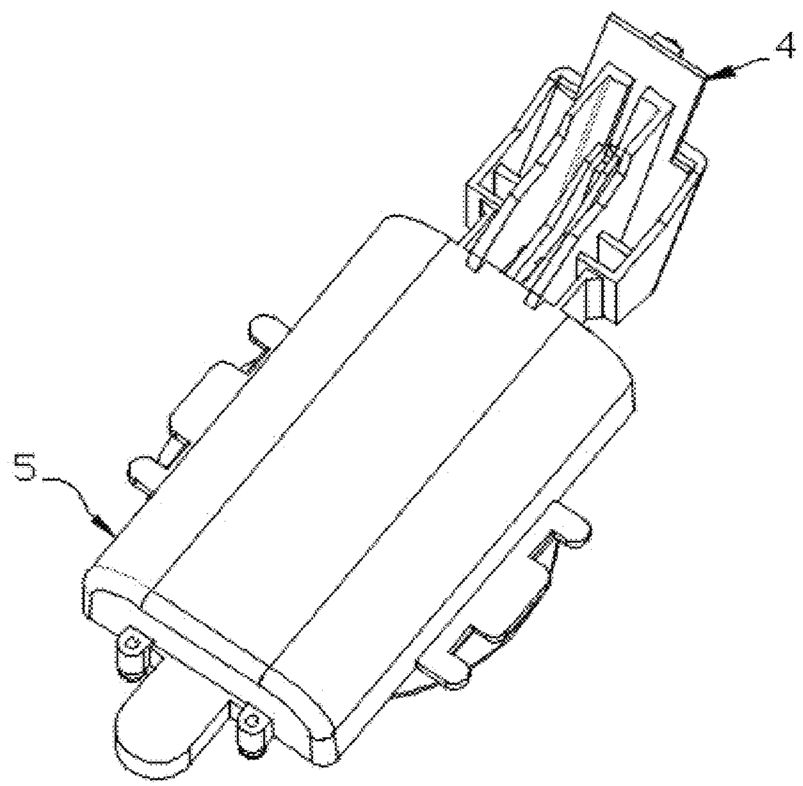
FIG. 4 is a schematic diagram of a control panel and a battery of the present disclosure.

As shown in FIGS. 1-4, a wall lamp is provided, including: a housing 1, where the housing 1 is in the shape of an animal, hollow structures 2 are arranged on corresponding positions of the housing 1 on a left side, a right side and a lower side respectively; lamp assemblies 3, where the lamp assemblies 3 are arranged inside the housing 1, and the lamp assemblies 3 are configured for emitting light; a control panel 4, where the control panel 4 is arranged inside the housing 1, and the control panel 4 is electrically connected to the lamp assemblies 3; a battery 5, where the battery 5 is arranged on a side of the housing 1 close to an installation wall, and the battery 5 is electrically connected to the control panel 4; and a remote controller, where the remote controller is in communication connection with the control panel 4, and the remote controller is configured for outputting control instructions. A shadow cast outside the housing 1 when light emitted by the lamp assemblies 3 passes through each of the hollow structures 2 constitutes a part of the animal's shape.

To solve the technical problems described in the Background, a wall lamp is provided. The wall lamp is designed to be shaped like a bird, a rabbit or any other animal. Either of the lamp assemblies 3 includes a plurality of lamp beads, the control panel 4 is a PLC control panel, and the control panel 4 is paired with the remote controller, which enables use of the wall lamp in a controlled manner, e.g., the lamp assemblies 3 can be started or the lamp assemblies 3 can work in a timing manner through the remote controller. The battery 5 can be rechargeable. The hollow structures 2 are arranged on the housing 1 in accordance with the shape and style of an animal. It is needed to ensure that a shadow cast when light emitted by the lamp assemblies 3 passes through each of the hollow structures 2 constitutes a part of the animal's shape. The shadow constitutes a part of the animal's shape. Specifically, when a shape of a bird is adopted, the shadow cast when light emitted by the lamp assemblies 3 passes through each of the hollow structures 2 can present a pattern of the bird's wing. When a shape of a rabbit is adopted, the shadow cast when light emitted by the lamp assemblies 3 passes through each of the hollow structures 2 can present a pattern of the rabbit's ear or the like.

In use, a user controls the lamp assemblies 3 to work through the remote controller. When light emitted by the working lamp assemblies 3 passes through each of the hollow structures 2 in the housing 1, the shadow cast against the installation wall constitutes a part of the animal's shape. The remote controller is capable of achieving timed control of the lamp assemblies 3. In this way, modes of using the wall lamp are enriched, and a visual effect of the wall lamp is enhanced. Further, in combination with the remote controller, the wall lamp can be used in a controllable and more convenient manner.

In an implementable technical solution, the housing 1 is in the shape of a bird. The hollow structures 2 are formed by wing hole sites distributed in an array manner. The hollow structure 2 on the left side is used to project a left wing of the bird, the hollow structure 2 on the right side is used to project a right wing of the bird, and the hollow structure 2 on the lower side is used to project a tail wing of the bird. The lamp assemblies 3 are respectively arranged at corresponding positions of the hollow structures 2 on the left side and the right side away from an end of the battery 5 in the housing 1.

The housing 1 is designed to be shaped like a bird, e.g., a shape of an eagle can be adopted. The design is needed to ensure that the shadow cast when light emitted by the lamp assemblies 3 pass through each of the hollow structures 2 can present a pattern of an eagle spreading two wings. The hollow structures 2 are arranged on the corresponding positions of the housing 1 on the left side, the right side and the lower side respectively. In use, in order to improve the projection effect, the lamp assemblies 3 are arranged at corresponding positions of the left side and the right side respectively. When light emitted by the lamp assemblies 3 passes through the hollow structures 2 on the left side, the right side and the lower side, patterns of the left wing, the right wing and the tail wing of the eagle are presented, and a shape of the eagle spreading its two wings is formed.

Specifically, the present disclosure further includes a charging port 6, the charging port 6 is arranged on the control panel 4 and exposed outside the housing 1, and the charging port 6 is configured for charging the battery 5.

In use, the battery 5 can be a rechargeable battery, and the charging port 6 is added for charging the battery 5 to achieve longer endurance.

Further, at least one opening 7 is formed at a rear side position of the housing 1, and the opening 7 is configured for hanging the wall lamp. A magnet 8 is arranged at a rear side position of the housing 1, and the magnet 8 is configured for magnetic suspension of the wall lamp.

To facilitate the installation of the wall lamp, the opening 7 and the magnet 8 are arranged on the housing 1, where the opening 7 is capable of hanging the housing 1 on the wall conveniently, and the magnet 8 is capable of magnetically adsorbing and fixing the wall lamp to the wall, thus achieving simple installation and fixation.

The foregoing descriptions are not intended to limit the technical scope of the present disclosure. Therefore, any alteration, equivalent change and modification which are made to the above embodiments in accordance with the technical essence of the present disclosure all fall within the scope of protection of the technical solution of the present disclosure.

What it claimed is:

1. A wall lamp, comprising:

a housing, wherein the housing is in the shape of an animal, and hollow structures are arranged on corresponding positions of the housing on a left side, a right side and a lower side respectively;

lamp assemblies, wherein the lamp assemblies are arranged inside the housing, and the lamp assemblies are configured for emitting light;

a control panel, wherein the control panel is arranged inside the housing, and the control panel is electrically connected to the lamp assemblies;

a battery, wherein the battery is arranged on a side of the housing close to an installation wall, and the battery is electrically connected to the control panel; and a remote controller, wherein the remote controller is in communication connection with the control panel, the remote controller is configured for outputting control instructions, and a shadow cast outside the housing when light emitted by the lamp assemblies passes through each of the hollow structures constitutes a part of the animal's shape.

2. The wall lamp according to claim 1, wherein the housing is in the shape of a bird.

3. The wall lamp according to claim 2, wherein the hollow structures are formed by wing hole sites distributed in an array manner, the hollow structure on the left side is used to project a left wing of the bird, the hollow structure on the right side is used to project a right wing of the bird, and the hollow structure on the lower side is used to project a tail wing of the bird.

4. The wall lamp according to claim 3, wherein the lamp assemblies are respectively arranged at corresponding positions of the hollow structures on the left side and the right side away from an end of the battery in the housing.

5. The wall lamp according to claim 4, wherein a charging port is comprised, the charging port is arranged on the control panel and exposed outside the housing, and the charging port is configured for charging the battery.

6. The wall lamp according to claim 5, wherein at least one opening is formed at a rear side position of the housing, and the opening is configured for hanging the wall lamp.

7. The wall lamp according to claim 6, wherein a magnet is arranged at a rear side position of the housing, and the magnet is configured for magnetic suspension of the wall lamp.

* * * * *